I. E. MILLER.
COOKING UTENSIL.
APPLICATION FILED DEC. 29, 1909.
1,020,304.
Patented Mar. 12, 1912.
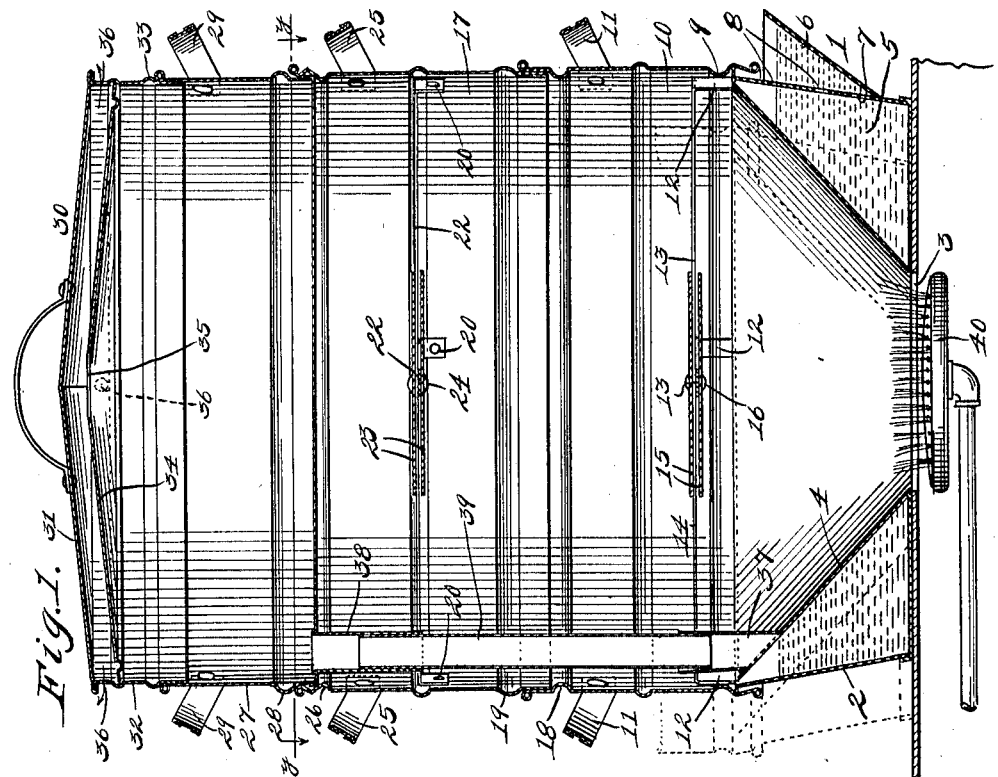
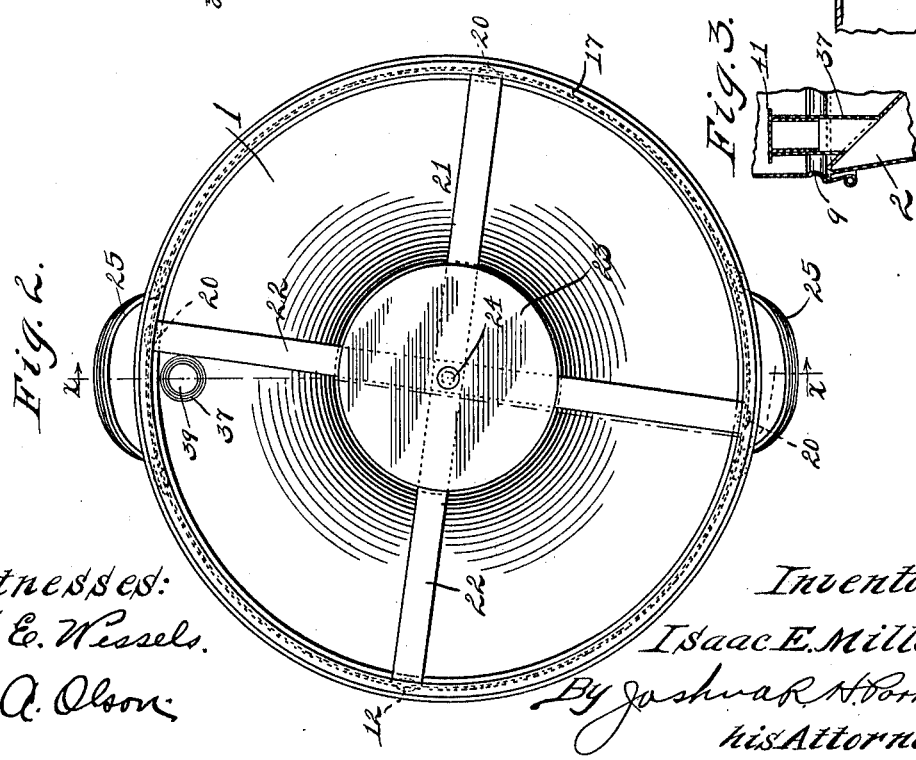
Witnesses:
C. E. Wessels.
A. A. Olson.
Inventor:
Isaac E. Miller,
By Joshua R. H. Potts
his Attorney.

UNITED STATES PATENT OFFICE.

ISAAC E. MILLER, OF CHICAGO, ILLINOIS.

COOKING UTENSIL.

1,020,304.   Specification of Letters Patent.   Patented Mar. 12, 1912.

Application filed December 29, 1909. Serial No. 535,452.

*To all whom it may concern:*

Be it known that I, ISAAC E. MILLER, a citizen of the United States, residing at Chicago, county of Cook, and State of Illinois, have invented certain new and useful Improvements in Cooking Utensils, of which the following is a specification.

My invention relates to cooking utensils and has for its object the production of a device of such character which may be employed to cook articles in a variety of different ways, such as to roast, bake, steam, or stew the same.

A further object is the production of a device of the character mentioned which will be of a sectional nature whereby the same may be reduced or increased in size so as to adapt it to accommodate articles of various dimensions or various numbers of articles.

Another object is the provision of a cooking utensil as mentioned which will be efficient in operation and of strong and durable construction.

Other objects will appear hereinafter.

With these objects in view my invention consists in a cooking utensil characterized as above mentioned and in certain details of construction and arrangement of parts all as will be hereinafter fully described and particularly pointed out in the appended claims.

My invention will be more readily understood by reference to the accompanying drawings forming a part of this specification, and in which, Figure 1 is a central vertical section of the preferred form of my device taken on substantially line $x-x$ of Fig. 2, Fig. 2 is a horizontal section thereof taken on substantially line $y-y$ of Fig. 1, or simply a top plan view with the upper section removed, and Fig. 3 is a sectional detail.

Referring now to the drawings 1 indicates the lower heating member or boiler of the device comprised in which is an outer shallow pan-portion 2 provided centrally in the bottom thereof with an opening 3. A conical partition 4 extends from the upper edge of said pan-portion to the surrounding edge of the opening 3, as shown, whereby an annular water chamber 5 is formed. A spout 6 is provided upon the lateral wall of the member 1, said wall being provided with a larger water inlet or discharge opening 7 communicating with the lower extremity of said spout and smaller steam escapement openings 8 adjacent the upper edge thereof. In use, the boiler 1 should contain only such a quantity of water as to leave open at least one of the openings 8 for escapement of steam, to thereby avoid explosion by over-pressure.

Arranged over the member 1, a circumferential internal bead 9 formed therein adjacent the lower edge thereof resting upon the upper edge of the member 1, is a tubular member of section 10 open at both ends. Opposingly arranged upon the outer surface of the member 10 are suitable handles 11. Arranged within the member 10, the depending extremities 12 of the comprising arms 13 thereof being removably supported upon the upper edge of the member 1, is a supporting web 14. Said arms 13, as seen, are disposed at right angles to each other and are united at their centers together with disks 15 by a rivet 16. Arranged above the member 10 is a member 17 similar in form to the latter. The lower end of the member 17 telescopes with the upper end of the member 10, as shown, the lower extremity thereof resting upon an internal bead 18 formed in the member 17 adjacent the upper edge thereof. The member 17 adjacent its lower edge is also formed with an external bead 19 which is adapted to engage the upper edge of the member 10. Hence the member 17 is supported upon the latter.

Rigidly secured, as by rivets 20, within the member 17 is a supporting web 21 similar to the web 14 before described, the same comprising the angularly disposed arms 22 and the central disks 23 secured together by a rivet 24. Said member 17 is also provided with suitable exteriorly diametrically opposed handles 25.

Having its lower end portion telescoping with the upper end portion of the member 17, the latter being provided adjacent its upper extremity with an internal circumferential bead 26 adapted to support the same, is a cylindrical receptacle 27 open only at its upper end. The lateral wall of said receptacle is also provided adjacent its lower extremity with an external circumferential bead 28 adapted to engage the upper edge of the member 17. Hence said receptacle is detachably supported in position in the latter. Diametrically opposed handles 29 are also provided upon the lateral walls of said receptacle.

30 indicates a handled lid comprising a preferably conical top portion 31 and a depending flange portion 32 at the periphery of said top portion. Said flange portion is of a diameter adapting it for reception in the upper end of any of the members or sections 10, 17 or 27 the latter being all formed of a uniform inner diameter, and is provided with an external circumferential bead 33 adapted, when the lid is positioned upon any of the sections, to limit insertion of said flange into the latter. Having its peripheral edge secured, as by solder, to the flange 32, the same being spaced from and disposed parallel with the top portion 31 is an auxiliary top plate or wall 34. The latter is provided centrally with an opening 35 and the flange 32 with a plurality of spaced perforations 36 communicating with the space intervening the top walls 31 and 34. With this provision, when the utensil is in operation and said lid is in position on one of sections 10 or 17, the heated gases arising from the heating medium over which the device is arranged, and which ascend in the latter, will first contact the auxiliary top wall 34. The latter, because of its conical form, will divert some of said gases inwardly and downwardly into contact with the upper surface of the article being cooked and whereby a uniform cooking of the article is effected. By the double walled construction of the traversing portion of the lid, the heated gases will not contact with the cooler upper or outer wall of the lid, which would evidently effect the cooling thereof, until immediately before the same is exhausted through the perforations 36. Hence the gases which act upon the top surface of the article being cooked will be of substantially the same temperature as those acting upon the bottom and lateral surfaces thereof with the result before stated.

Provided upon the lower section or water container 1 adjacent the periphery thereof the same communicating with the annular water chamber 5 in said section, is an upwardly projecting nipple 37. Provided in the bottom of the receptacle 27 adjacent the periphery thereof is a depending nipple 38. Extending between said nipples 37 and 38 is a detachable pipe connection 39. With this provision it will be seen that in use if it is desired to steam an article in the upper section without subjecting the interiors of the intermediate sections to the same treatment, it may be readily effected by the employment of said pipe connection, as shown and described. The course of the steam through lid 30 will be the same as that of the heated gases and with substantially the same effects. However, when it is desired to steam an article as stated, the member 1 must needs be so arranged over the heating medium or burner 40 that the heating flame will contact the under surface of said member, such position thereof being indicated in dotted lines in Fig. 1. When the device is so arranged the heating of the water in the member 1, and hence the desired generation of steam will be effected.

With the provision of a device of a construction as shown and described, articles or receptacles containing the same may be arranged in either of the sections 10 and 17 upon the supporting webs provided therein. If it is desired to dry-cook, for instance, to bake the same and to not employ the upper section, the member 1 may be arranged centrally over the heating medium, as shown in full lines, and the pipe connection 39 removed and replaced by a closure 41. In this case the upper receptacle may be removed from its position and the lid arranged upon the section 17. If it is desired to steam articles in these sections, the device needs only to be positioned as before described eccentrically over the heating medium and said closure removed. With these illustrations it will be observed that various combinations to cook articles in different ways may be employed and that any one of the sections may be separately employed or all may be simultaneously used.

The annular water chamber serves as a water jacket for the hot gases from the burner and thus absorbs heat which would otherwise be radiated and lost, and the arrangement furnishes a convenient and efficient means for supplying either dry or moist heat to the cooker.

While I have shown what I deem to be the preferable form of my device I do not wish to be limited thereto as there might be various changes made in the details of construction and the arrangement of parts described without departing from the spirit of the invention comprehended within the scope of the appended claims.

Having described my invention what I claim as new and desire to secure by Letters Patent is:

1. A base comprising a closed annular water container having a centrally disposed heat passage way, a section above said base in direct communication with said passage way, a receptacle above said section, said receptacle being closed at the bottom and open at the top, a closure for the top of said receptacle, and a tubular connection between said water container and said receptacle, substantially as described.

2. A cooking utensil comprising a base member open at the top and bottom and provided with an annular water container, a plurality of super-imposed open tubular sections having supports therein and communicating with each other and said base member, a receptacle arranged above said tubular sections, said receptacle being closed at the bottom and provided with a top closure, said closure being adapted to fit either of said tubular sections, a nipple on the bottom of said receptacle communicating with the interior thereof, a similar nipple on the upper face of said water container and a detachable pipe arranged within said sections and connecting said nipples, substantially as described.

In testimony whereof I have signed my name to this specification in the presence of two subscribing witnesses.

ISAAC E. MILLER.

Witnesses:
ARTHUR A. OLSON,
JOSHUA R. H. POTTS.

Copies of this patent may be obtained for five cents each, by addressing the "Commissioner of Patents, Washington, D. C."